(12) United States Patent
Seo et al.

(10) Patent No.: US 8,705,658 B2
(45) Date of Patent: Apr. 22, 2014

(54) METHOD AND APPARATUS OF MODULATING SIGNAL IN BROADCASTING AND COMMUNICATION SYSTEM

(75) Inventors: Jae Hyun Seo, Daejeon-si (KR); Hyoungsoo Lim, Daejeon-si (KR); Heung Mook Kim, Daejeon-si (KR); Soo In Lee, Daejeon-si (KR)

(73) Assignee: Intellectual Discovery Co., Ltd., Seoul (KR)

( * ) Notice: Subject to any disclaimer, the term of this patent is extended or adjusted under 35 U.S.C. 154(b) by 91 days.

(21) Appl. No.: 13/275,961

(22) Filed: Oct. 18, 2011

(65) Prior Publication Data

US 2012/0093262 A1     Apr. 19, 2012

(30) Foreign Application Priority Data

Oct. 19, 2010   (KR) .................. 10-2010-0102151
Feb. 22, 2011   (KR) .................. 10-2011-0015492

(51) Int. Cl.
  *H04L 27/20*     (2006.01)
(52) U.S. Cl.
  USPC ........... 375/308; 375/219; 375/220; 375/222; 375/226; 375/279; 375/316; 375/329

(58) Field of Classification Search
  USPC ......... 375/308, 329, 219, 220, 222, 226, 279, 375/316
  See application file for complete search history.

(56) References Cited

U.S. PATENT DOCUMENTS

| | | | | |
|---|---|---|---|---|
| 7,480,351 | B2* | 1/2009 | Hiatt et al. | 375/332 |
| 7,620,113 | B2* | 11/2009 | Inagawa | 375/260 |
| 7,656,966 | B2* | 2/2010 | Walker et al. | 375/308 |
| 8,036,310 | B2* | 10/2011 | Ban | 375/308 |
| 2007/0195907 | A1* | 8/2007 | Wang et al. | 375/267 |

FOREIGN PATENT DOCUMENTS

KR    10-2006-0081404    7/2006

* cited by examiner

*Primary Examiner* — Leon Flores
(74) *Attorney, Agent, or Firm* — Staas & Halsey LLP (57) ABSTRACT

Modulating method and apparatus in a broadcasting and communication system are provided. The modulating apparatus includes: a first quadrature phase shift keying (QPSK) modulating unit QPSK-modulating first data including in-phase (I) data and quadrature (Q) data to generate a first signal; a phase rotating unit rotating a phase of the first signal by θ to generate a phase rotated signal; a second QPSK modulating unit QPSK-modulating second data different from the first data and including I' data and Q' data to generate a second signal; and a layer modulating unit modulating the phase rotated signal and the second signal to output a final signal.

11 Claims, 14 Drawing Sheets

METHOD AND APPARATUS OF MODULATING SIGNAL IN BROADCASTING AND COMMUNICATION SYSTEM

CROSS-REFERENCE TO RELATED APPLICATIONS

This application claims the benefit of priority of Korean Patent application No. 10-2010-0102151 filed on Oct. 19, 2010, and Korean Patent application No. 10-2011-0015492 filed on Feb. 22, 2011, all of which are incorporated by reference in their entirety herein.

BACKGROUND OF THE INVENTION

1. Field of the Invention

The present invention relates to a broadcasting and communication system, and more particularly, to a method and an apparatus of modulating a digital signal for transmission of the digital signal in a broadcasting and communication system.

2. Related Art

A modulation technology that is currently being used in a broadcasting and communication system may be mainly divided into a modulation technology using a single transmission channel and a modulation technology using two transmission channels. The modulation technology using a single transmission channel has a real (Re) axis in a signal constellation and includes a modulation technology such as vestigial side band (VSB), or the like. The modulation technology using two transmission channels has a real (Re) axis and an imaginary (Im) axis in a signal constellation and includes a modulation technology such as quadrature amplitude modulation (QAM), quadrature phase shift keying (QPSK), or the like. Recently, the modulation technology using two transmission channels capable of variously changing transmission capacity, such as QAM and QPSK has been mainly used.

Meanwhile, a layer modulation technology may be applied in modulating a digital signal. The digital video broadcasting-terrestrial (DVB-T) transmission standard of Europe includes a layer modulation technology. However, the layer modulation technology may also be applied to other fields that are not included in a transmission standard. The layer modulation technology may be applied in order to transmit additional data in addition to originally transmitted data. For example, the layer modulation technology may be applied as a combination of QPSK+QPSK, 16 QAM+QPSK, or the like. That is, main data and additional data may be transmitted in a scheme of modulating the main data using a QPSK or 16 QAM modulation technology, modulating the additional data using a QPSK modulation technology, and combining them with each other. When the layer modulation technology is applied, backward compatibility between a base layer and an additional layer is secured. The backward compatibility is secured, such that users having existing receivers may be protected. Even though the additional layer is added to a transmitting end, in addition to the base layer, separate reception signal processing for demodulating the base layer signal is not required at a receiving end. The reason is that when the base layer signal is demodulated at the receiving end, the additional layer signal acts as noise, such that it does not have an effect on demodulation of the base layer signal.

Therefore, a modulation and demodulation method in which a layer modulation technology is applied in order to transmit additional data in a communication and broadcasting system may be suggested.

SUMMARY OF THE INVENTION

The present invention provides a method and an apparatus of modulating a digital signal for transmission of the digital signal in a broadcasting and communication system.

In an aspect, a modulator in a broadcasting and communication system is provided. The modulator includes a first quadrature phase shift keying (QPSK) modulating unit QPSK-modulating first data including in-phase (I) data and quadrature (Q) data to generate a first signal, a phase rotating unit rotating a phase of the first signal by $\theta$ to generate a phase rotated signal, a second QPSK modulating unit QPSK-modulating second data different from the first data and including I' data and Q' data to generate a second signal, and a layer modulating unit modulating the phase rotated signal and the second signal to output a final signal.

The phase rotated signal may include a Re(I, Q) signal or an Im(I, Q) signal, where I and Q indicate components of the first signal generated by modulating the first data.

The Re(I, Q) signal or the Im(I, Q) signal may have any one value of +b, −b, +c, and −c.

The layer modulating unit may include a detecting unit detecting a value of the phase rotated signal on a real (Re) axis or an imaginary (Im) axis, a binary phase shift keying (BPSK) mapping unit mapping the second signal onto a constellation, and a multiplexer (MUX) multiplexing the phase rotated signal and the second signal mapped onto the constellation in a single signal stream form to output the final signal.

The final signal may include a Re(I, Q, I') signal or an Im(I, Q, Q') signal, where I and Q indicate components of the first signal generated by modulating the first data respectively and I' and Q' indicate components of the second signal generated by modulating the second data respectively.

Whether or not the second signal is applied to the final signal according to a value of the I' or the Q' may be determined when a specific value of the phase rotated signal is detected on the Re or Im axis.

d may be applied to a value of the Re(I, Q, I') signal when a value of a Re(I, Q) signal is +c or −c and a value of the I' is −1.

d may be applied to a value of the Im(I, Q, Q') signal when a value of an Im(I, Q) signal is +c or −c and a value of the Q' is −1.

In another aspect, a method of modulating a signal in a broadcasting and communication system is provided. The method includes modulating first data including in-phase (I) data and quadrature (Q) data by a quadrature phase shift keying (QPSK) scheme to generate a first signal, rotating a phase of the first signal by $\theta$ to generate a phase rotated signal, modulating second data different from the first data and including I' data and Q' data by a QPSK scheme to generate a second signal, and modulating the phase rotated signal and the second signal to output a final signal.

In another aspect, a demodulator in a broadcasting and communication system is provided. The demodulator includes a reverse-phase rotating unit reversely rotating a phase of a received signal by $\theta$ to generate a first signal, a first quadrature phase shift keying (QPSK) demodulating unit demodulating the first signal to recover a first data including in-phase (I) and quadrature (Q) data, and a second QPSK demodulating unit recovering second data different from the first data and including I' and Q' data from the received signal or the first signal.

The first data may be recovered by determining a sign of a value of the first signal on a real (Re) or imaginary (Im) axis.

The second data may be determined and recovered according to a range of a value of the received signal or the first signal.

DESCRIPTION OF EXEMPLARY EMBODIMENTS

Hereinafter, embodiments of the present invention will be described in detail with reference to the accompanying drawings so that those skilled in the art may easily practice the present invention. However, the present invention may be modified in various different ways and is not limited to the embodiments provided in the present description. In the accompanying drawings, portions unrelated to the description will be omitted in order to obviously describe the present invention, and similar reference numerals will be used to describe similar portions throughout the present specification. Further, when a detailed description is omitted, only a detailed description of portions that may be easily understood by those skilled in the art will be omitted.

Through the present specification and claims, unless explicitly described otherwise, "comprising" any components will be understood to imply the inclusion of other components rather than the exclusion of any other components.

Figure 1:
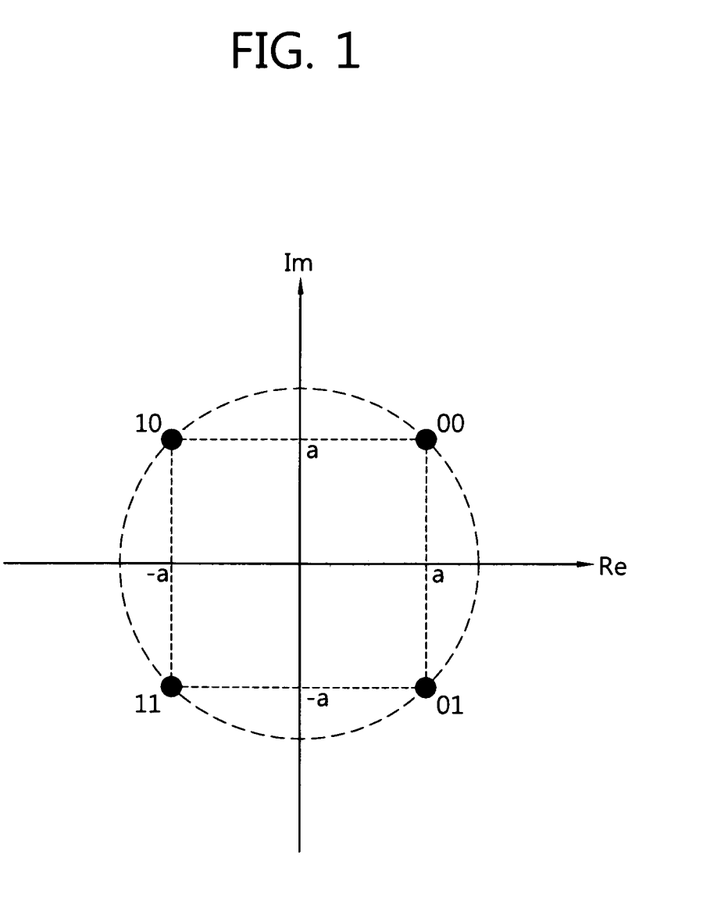
FIG. 1 shows a quadrature phase shift keying (QPSK) signal constellation according to the related art.

FIG. 1 shows a quadrature phase shift keying (QPSK) signal constellation according to the related art.

Referring to FIG. 1, the QPSK signal constellation includes four constellations. Each of the four constellations may be mapped to quadrants in a complex number plane configured of a real (Re) axis and an imaginary (Im) axis. Each constellation has a value of a +a or −a on the Re axis and a value of +a or −a on the Im axis. Therefore, each constellation may carry 2 bits of information. For example, a constellation in a first quadrant may have a value of '00', a constellation in a second quadrant may have a value of '10', a constellation in a third quadrant may have a value of '11', and a constellation in a fourth quadrant may have a value of '01'.

Figure 2:
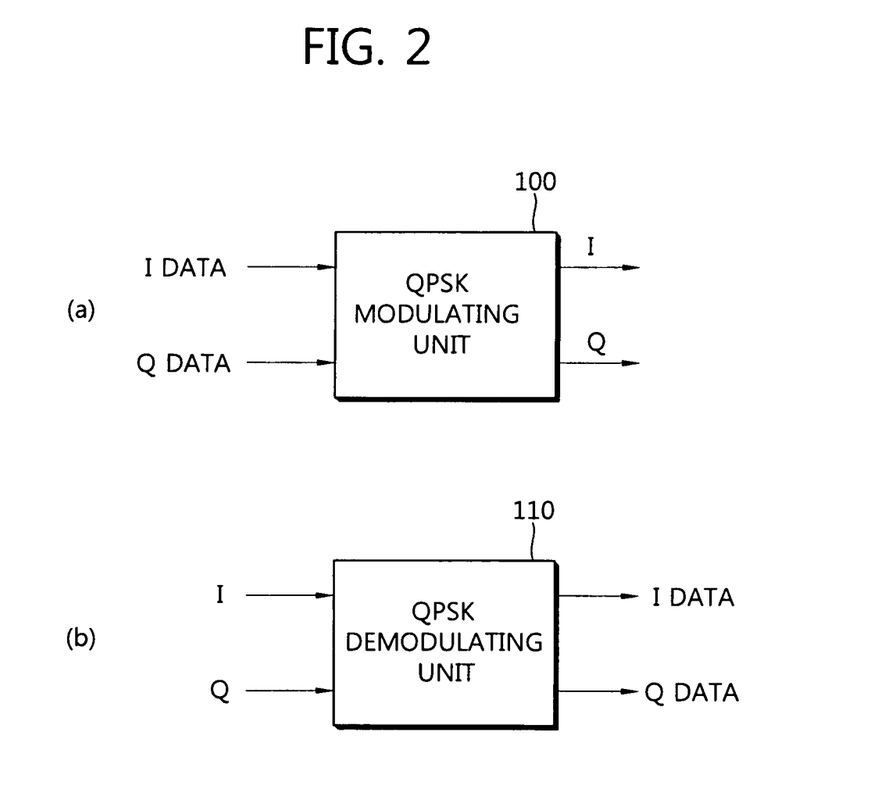
FIG. 2 shows an example of a QPSK modulator and demodulator according to the related art.

FIG. 2 shows an example of a QPSK modulator and demodulator according to the related art.

FIG. 2A shows a QPSK modulator according to the related art. A QPSK modulating unit 100 receives I (In-phase) data and Q (Quadrature) data as inputs to generate I and Q signals. FIG. 2B shows a QPSK demodulator according to the related art. A QPSK demodulating unit 110 receives the I and Q signals as inputs to recover the I and Q data.

Figure 3:
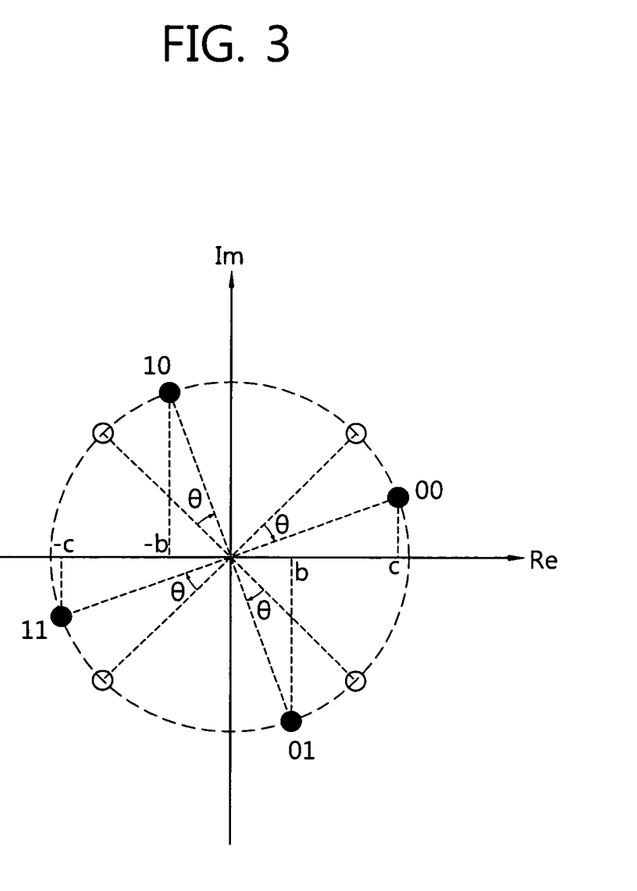
FIG. 3 shows a QPSK signal constellation to which a rotated constellation according to the related art is applied.

FIG. 3 shows a QPSK signal constellation to which a rotated constellation according to the related art is applied.

Figure 4:
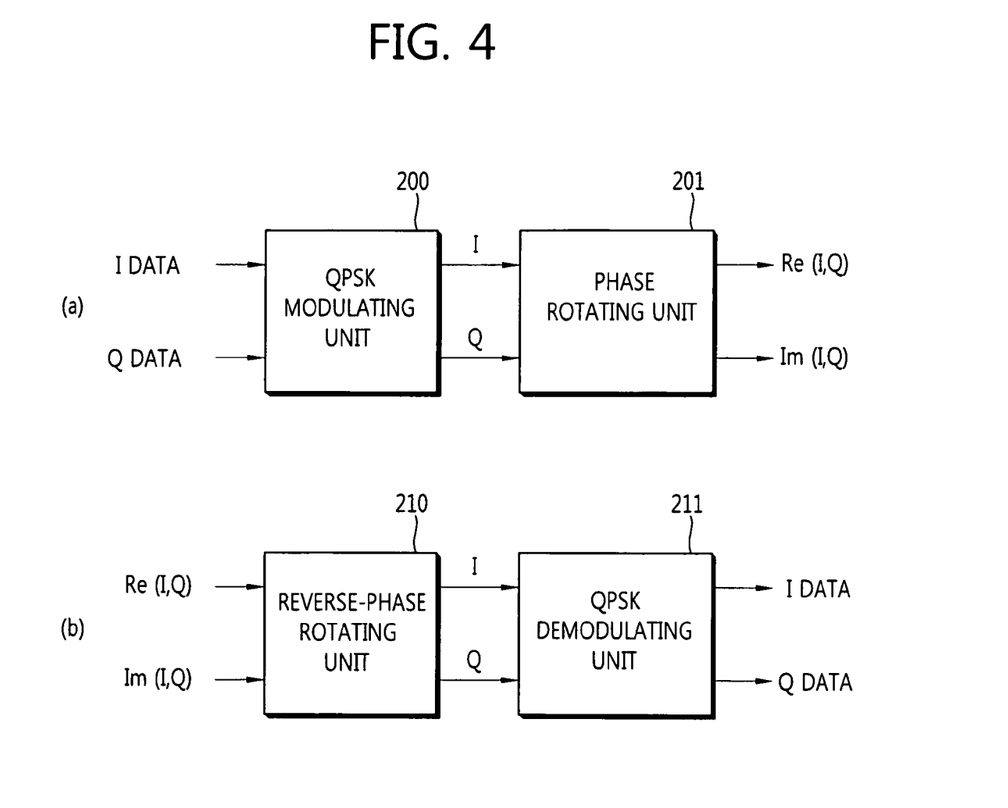
FIG. 4 shows an example of a QPSK modulator and demodulator to which the rotated constellation according to the related art is applied.

Referring to FIG. 3, the four constellations of FIG. 4 are rotated by θ. Therefore, the rotated four constellations have any one value of +b, −b, +c, and −c on the Re axis. Alternatively, the rotated four constellations have any one value of +b, −b, +c, and −c on the Im axis. Therefore, it is possible to represent information of 00', '01', '11', and '01' only using any one value among the values on the Re axis or the values on the Im axis.

FIG. 4 shows an example of a QPSK modulator and demodulator to which the rotated constellation according to the related art is applied.

FIG. 4A shows a QPSK modulator to which the rotated constellation according to the related art is applied. A QPSK modulating unit 200 receives I and Q data as inputs to generate I and Q signals. The phase rotating unit 201 rotates phases of the generated I and Q signals by θ to output a Re (I, Q) signal and an Im (I, Q) signal. FIG. 4B shows a QPSK demodulator to which the rotated constellation according to the related art is applied. A reverse-phase rotating unit 210 receives the Re (I, Q) signal and the Im (I, Q) signal as inputs and reversely rotates phases of the Re (I, Q) signal and the Im (I, Q) signal by θ to recover the I and Q signals. A QPSK demodulating unit 211 receives the I and Q signals as inputs to recover the I and Q data. Here, a determination that '00' is +c, '01' is +b, '10' is −b, and '11' is −c on the Re axis is made only using the Re(I, Q) signal, thereby making it possible to recover the I and Q signals. Alternatively, a determination that '00' is +c, '01' is +b, '10' is −b, and '11' is −c on the Im axis is made only using the Im(I, Q) signal, thereby making it possible to recover the I and Q signals.

Hereinafter, a method and an apparatus of modulating a signal suggested according to an exemplary embodiment of the present invention will be described. A layer modulation technology may be applied to the QPSK modulation technology to which the rotated constellation according to the related art is applied by the method and the apparatus of modulating a signal suggested according to the exemplary embodiment of the present invention. Therefore, it is possible to transmit additional data while securing backward compatibility. In the QPSK modulation technology according to the related art, when the I and Q signals divided into the Re and Im axes are lost during transmission, the lost I and Q signals may not be recovered. However, when the rotated constellation is applied, since each of the I and Q signals is included in the Re and Im axes, even though any one of the I and Q signals is lost, both of the I and Q signals may be recovered. In addition, the layer modulation technology is applied to the QPSK modulation technology to which the rotated constellation is applied, such that newly added I' and Q' data may also be independently recovered at a receiving end. Hereinafter, Re(I, Q) indicates a value including information that I and Q signals are distinguished on the Re axis, and Im(I, Q) indicates a value including information that I and Q signals are distinguished on the Im axis.

Figure 5:
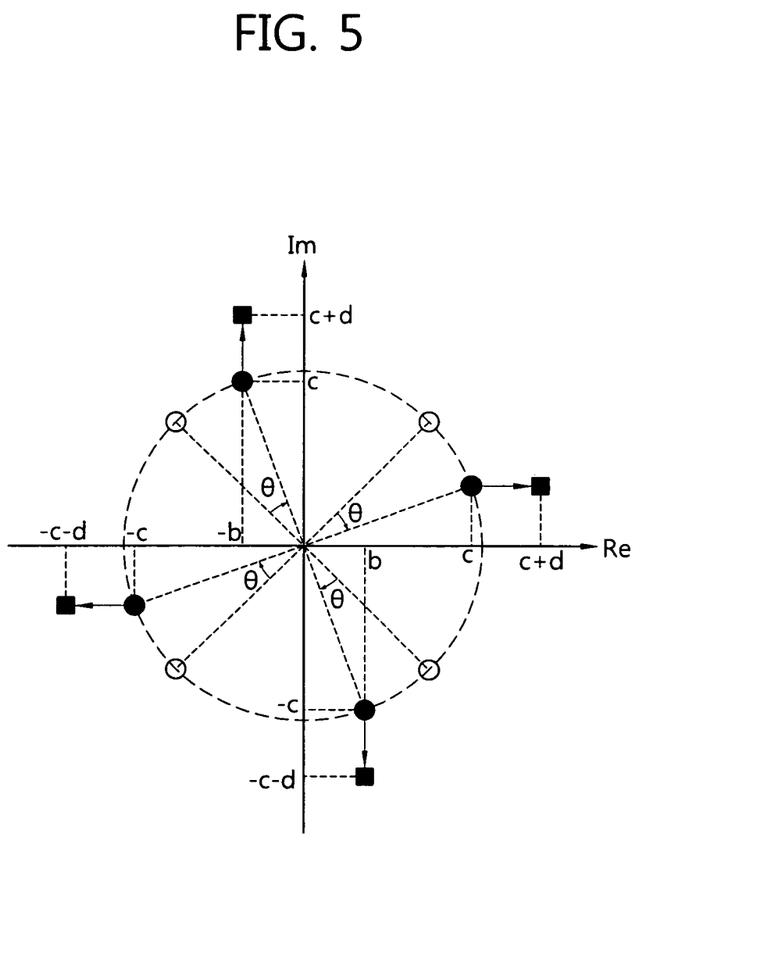
FIG. 5 shows an example of an extended QPSK signal constellation to which a method of modulating a signal suggested according to an exemplary embodiment of the present invention is applied.

FIG. 5 shows an example of an extended QPSK signal constellation to which a method of modulating a signal suggested according to an exemplary embodiment of the present invention is applied.

Referring to FIG. 5, the QPSK constellation to which the rotated constellation of FIG. 3 is applied is extended on the Re axis or the Im axis. Hereinafter, an example in which the QPSK signal constellation is extended on the Re axis will be described. However, the QPSK signal constellation is not limited to being extended on the Re axis but may also be extended on the Im axis by the same method. The QPSK constellation to which the rotated constellation of FIG. 3 is applied has any one value of +b, −b, +c, and −c on the Re axis. Therefore, it is possible to represent information of 00', '01', '11', and '01' only using the values on the Re axis. Here, +d or −d is applied to the values on the Re axis by the layer modulation technology, thereby making it possible to extend the QPSK signal constellation. The +d or −d corresponds to additional data and may be obtained from an I' or Q' signal obtained by QPSK-modulating I' and Q' data that are different from the I and Q data. That is, +d or −d may be a value of a constellation of the I' or Q' signal on a Re or Im axis.

An I' signal may be mapped to a Re(I, Q) signal by the layer modulation technology. That is, a Re(I, Q, I') signal may be output from the Re(I, Q) signal and the I' signal. For example, when the Re(I, Q) is +c and the I' signal is +1, the Re(I, Q, I') may be +c. When the Re(I, Q) is +c and the I' signal is −1, the Re(I, Q, I') may be +c+d. When the Re(I, Q) is −c and the I' signal is +1, the Re(I, Q, I') may be −c. When the Re(I, Q) is −c and the I' signal is −1, the Re(I, Q, I') may be −c−d.

In addition, a Q' signal may be mapped to an Im(I, Q) signal by the layer modulation technology. That is, a Im(I, Q, Q') signal may be output from the Im(I, Q) signal and the Q' signal. For example, when the Im(I, Q) is +c and the Q' signal is +1, Im(I, Q, Q') may be +c. When the Im(I, Q) is +c and the Q' signal is −1, the Im(I, Q, Q') may be +c+d. When the Im(I, Q) is −c and the Q' signal is +1, the Im(I, Q, Q') may be −c. When the Im(I, Q) is −c and the Q' signal is −1, the Im(I, Q, Q') may be −c−d.

When the layer modulation technology is applied, it is possible to control reception performance of the I and Q signals or the I' and Q' signals according to a size of d. That is, when the value of d is large, the reception performance of the I and Q signals becomes low and the reception performance of the I' and Q' signals becomes high. On the other hand, when the value of d is small, the reception performance of the I' and Q' signals becomes low and the reception performance of the I and Q signals becomes high.

Figure 6:
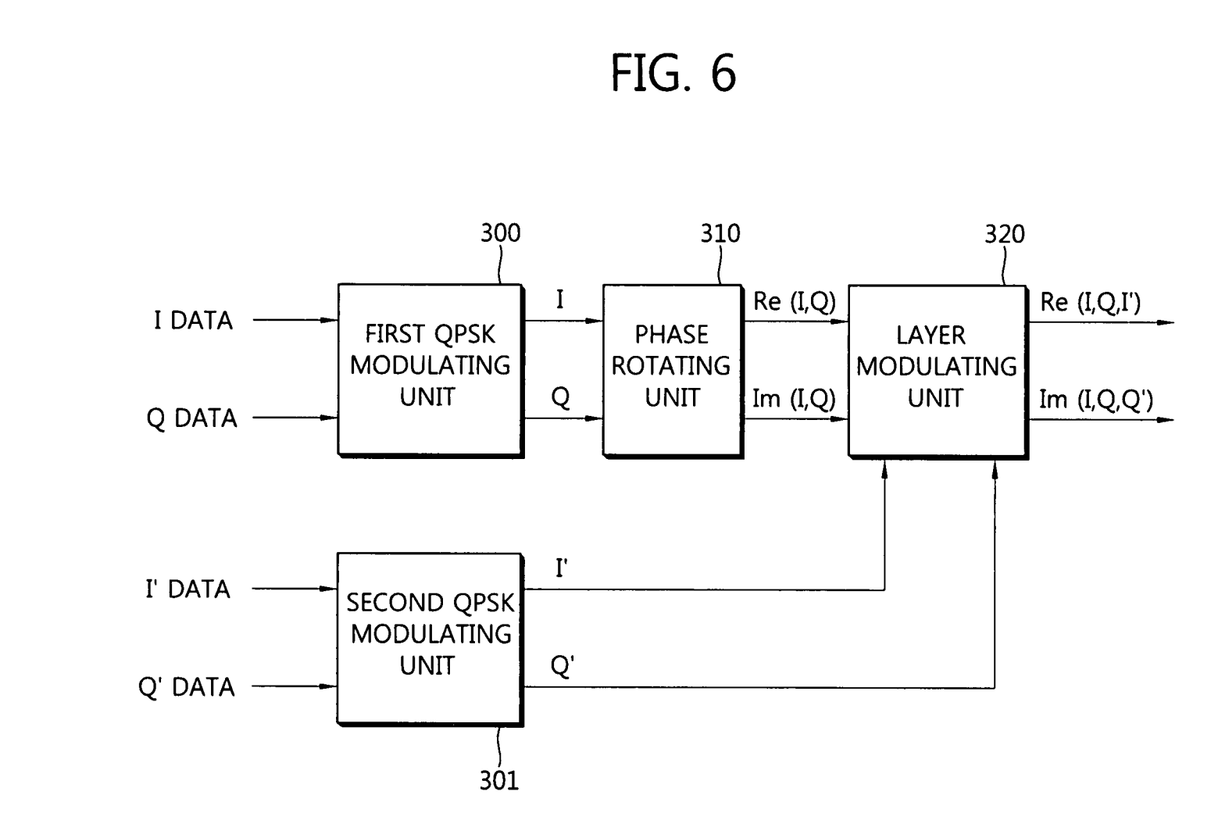
FIG. 6 shows an example of a QPSK modulator implementing the method of modulating a signal suggested according to the exemplary embodiment of the present invention.

FIG. 6 shows an example of a QPSK modulator implementing the method of modulating a signal suggested according to the exemplary embodiment of the present invention.

Referring to FIG. 6, a first QPSK modulating unit 300 receives I and Q data as inputs to generate I and Q signals. A phase rotating unit 310 rotates phases of the generated I and Q signals by θ to output a Re (I, Q) signal and an Im (I, Q) signal. A second QPSK modulating unit 301 receives I' and Q' data as inputs to generate I' and Q' signals. A layer modulating unit 320 combines the Re (I, Q) signal output from the phase rotating unit 310 and the I' signal output from the second QPSK modulating unit 301 with each other to output a Re(I, Q, I') signal. In addition, the layer modulating unit 320 combines the Im (I, Q) signal output from the phase rotating unit 310 and the Q' signal output from the second QPSK modulating unit 301 with each other to output an Im(I, Q, Q') signal.

Figure 7:
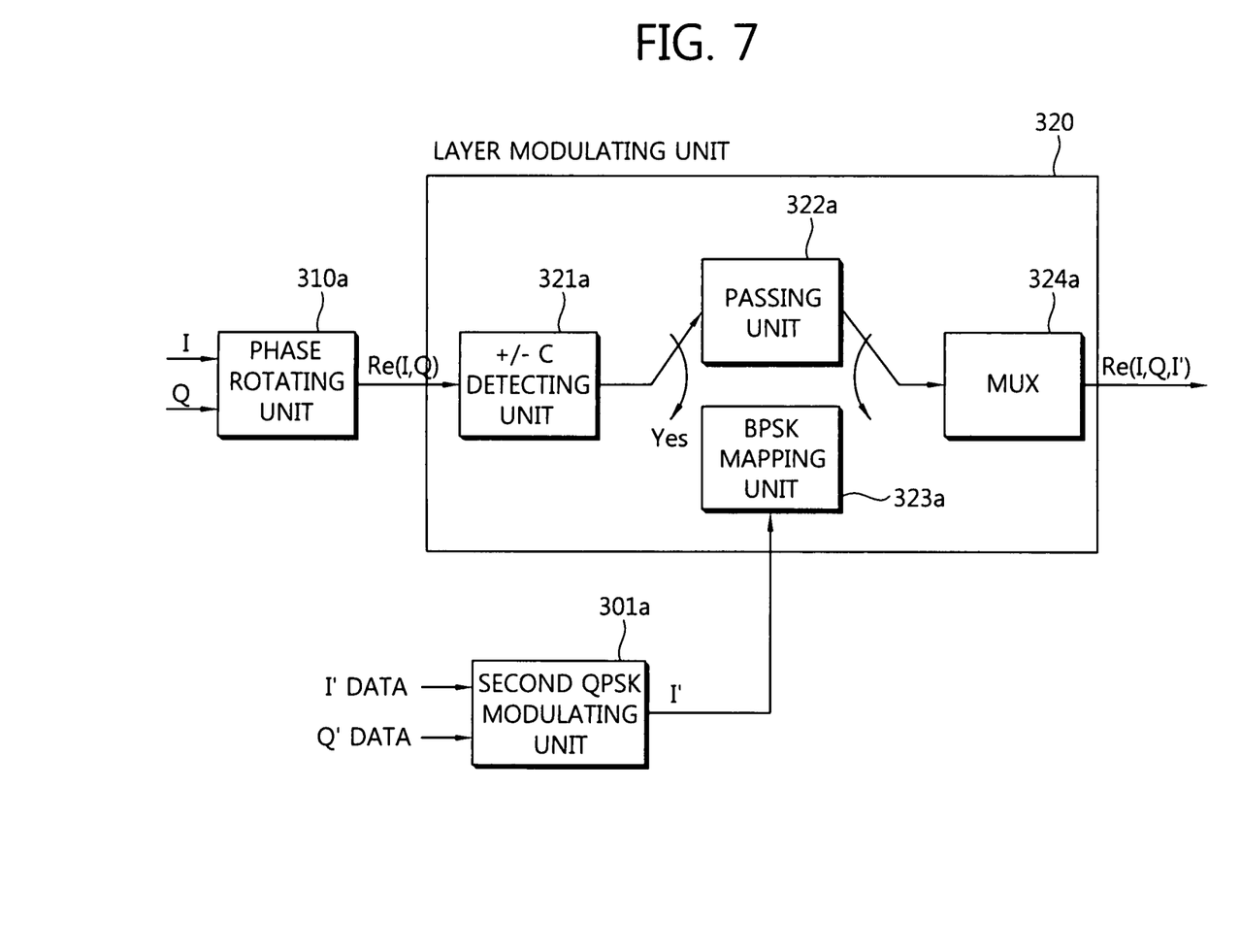
FIG. 7 shows an example of a detailed structure of a layer modulating unit in the QPSK modulator implementing the method of modulating a signal suggested according to the exemplary embodiment of the present invention.

FIG. 7 shows an example of a detailed structure of a layer modulating unit in the QPSK modulator implementing the method of modulating a signal suggested according to the exemplary embodiment of the present invention.

A layer modulating unit mapping the I' signal to the Re(I, Q) signal in the layer modulating unit 320 of FIG. 6 is shown in detail in FIG. 7. A phase rotating unit 310a rotates the phases of the I and Q signals generated in the first QPSK modulating unit by θ to output a Re(I, Q) signal. A +/−c detecting unit 321a determines whether a value of the Re(I, Q) signal is +c or −c. When it is determined that the value of the Re(I, Q) signal is +b or −b, the Re(I, Q) signal is output through a passing unit 322a and a multiplexer (MUX) 324a without separate processing. When it is determined that the value of the Re(I, Q) signal is +c or −c, a binary phase shift keying (BPSK) mapping unit 323a maps the Re(I, Q) signal together with the I' signal generated by allowing the I' and Q' data to pass through the second QPSK modulating unit 301a. Here, the Re(I, Q) signal and the I' signal may be mapped as in the method described with reference to FIG. 5. The MUX 324a multiplexes the output of the passing unit 322a and the output of the BPSK mapping unit 323a in a single signal stream form to output the Re(I, Q, I') signal.

Figure 8:
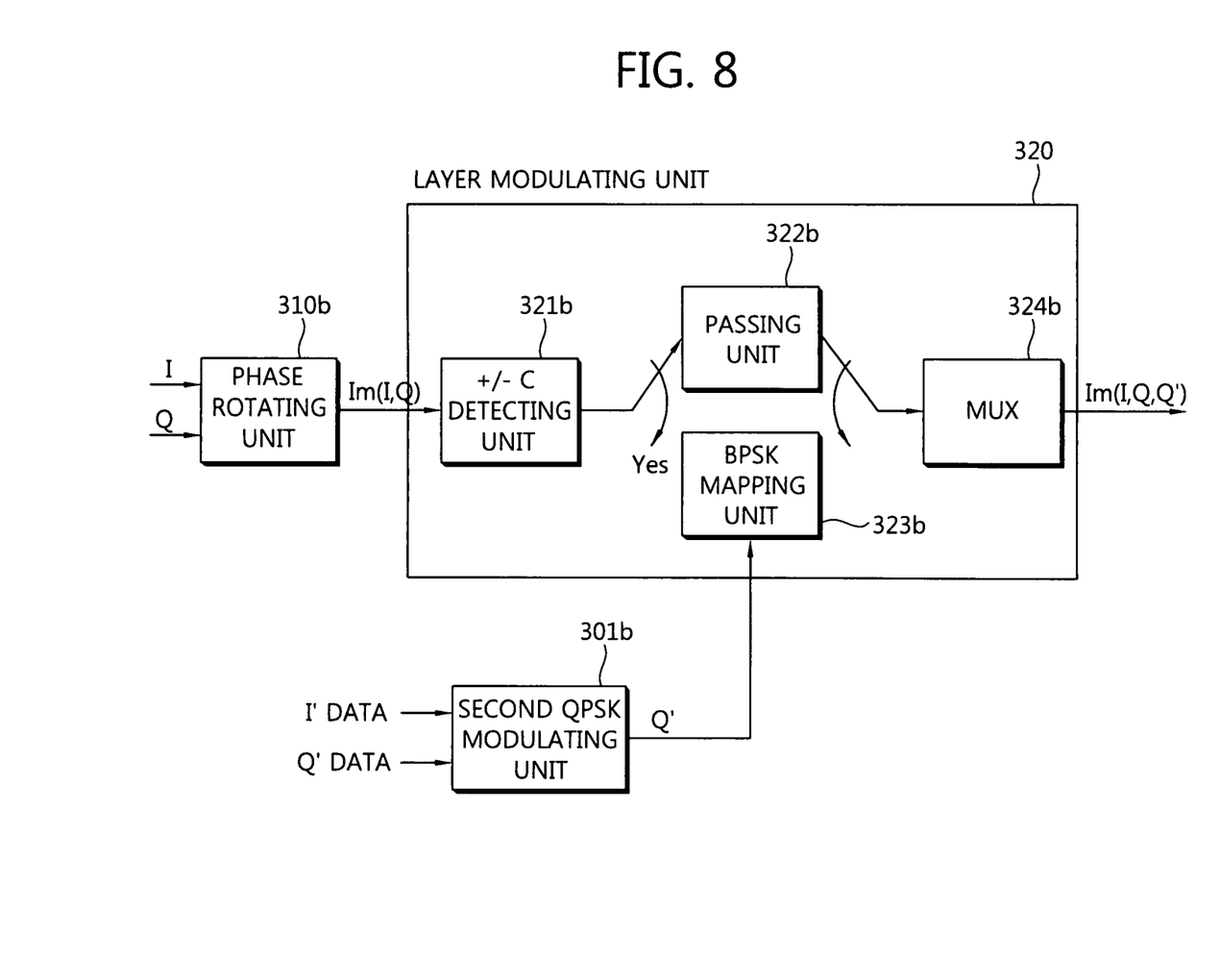
FIG. 8 shows another example of a detailed structure of the layer modulating unit in the QPSK modulator implementing the method of modulating a signal suggested according to the exemplary embodiment of the present invention.

FIG. 8 shows another example of a detailed structure of the layer modulating unit in the QPSK modulator implementing the method of modulating a signal suggested according to the exemplary embodiment of the present invention.

A layer modulating unit mapping the Q' signal to the Im(I, Q) signal in the layer modulating unit 320 of FIG. 6 is shown in detail in FIG. 8. A phase rotating unit 310b rotates the phases of the I and Q signals generated in the first QPSK modulating unit by θ to output an Im(I, Q) signal. A +/−c detecting unit 321b determines whether a value of the Im(I, Q) signal is +c or −c. When it is determined that the value of the Im(I, Q) signal is +b or −b, the Im(I, Q) signal is output through a passing unit 322b and a MUX 324b without separate processing. When it is determined that the value of the Im(I, Q) signal is +c or −c, a BPSK mapping unit 323b maps the Im(I, Q) signal together with the Q' signal generated by allowing the I' and Q' data to pass through the second QPSK modulating unit 301b. Here, the Im(I, Q) signal and the Q' signal may be mapped as in the method described with reference to FIG. 5. The MUX 324b multiplexes the output of the passing unit 322b and the output of the BPSK mapping unit 323b in a single signal stream form to output the IM(I, Q, Q') signal.

Figure 9:
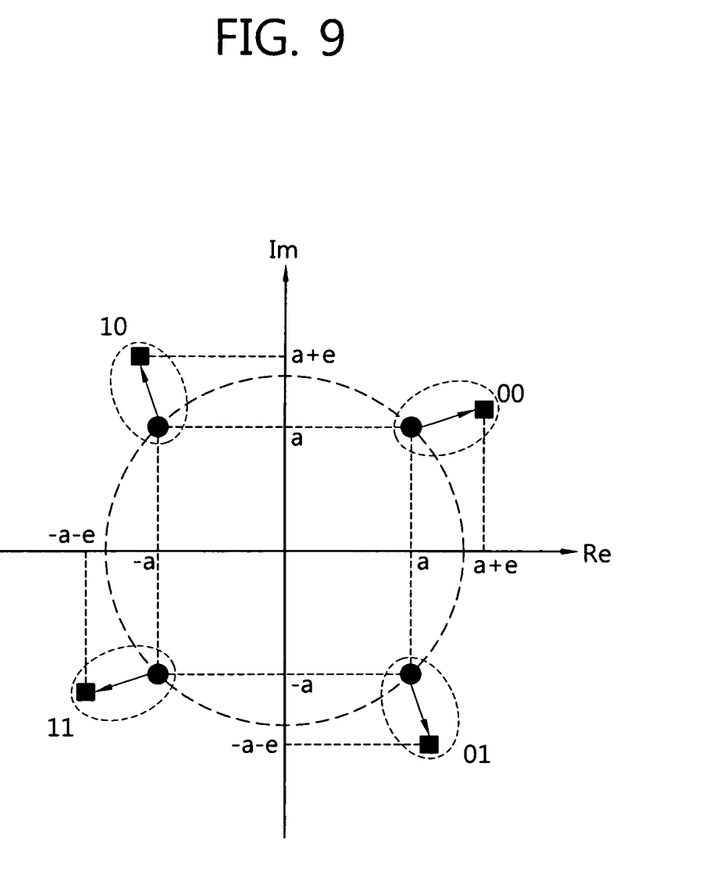
FIG. 9 shows an example of an output signal constellation of a reverse-phase rotating unit in a QPSK demodulator implementing a method of demodulating a signal suggested according to an exemplary embodiment of the present invention.

FIG. 9 shows an example of an output signal constellation of a reverse-phase rotating unit in a QPSK demodulator implementing a method of demodulating a signal suggested according to an exemplary embodiment of the present invention.

Referring to FIG. 9, each of four output signal constellations has any one value of +a, −a, +a+e, or −a−e in each of the Re and Im axes. Here, a value of +e or −e may be regarded as noise in a QPSK demodulator according to the related art, and a single constellation may carry two bits of information. For example, a constellation in a first quadrant may carry a value of '00', a constellation in a second quadrant may carry a value of '10', a constellation in a third quadrant may carry a value of '11', and a constellation in a fourth quadrant may carry a value of '01'.

Figure 10:
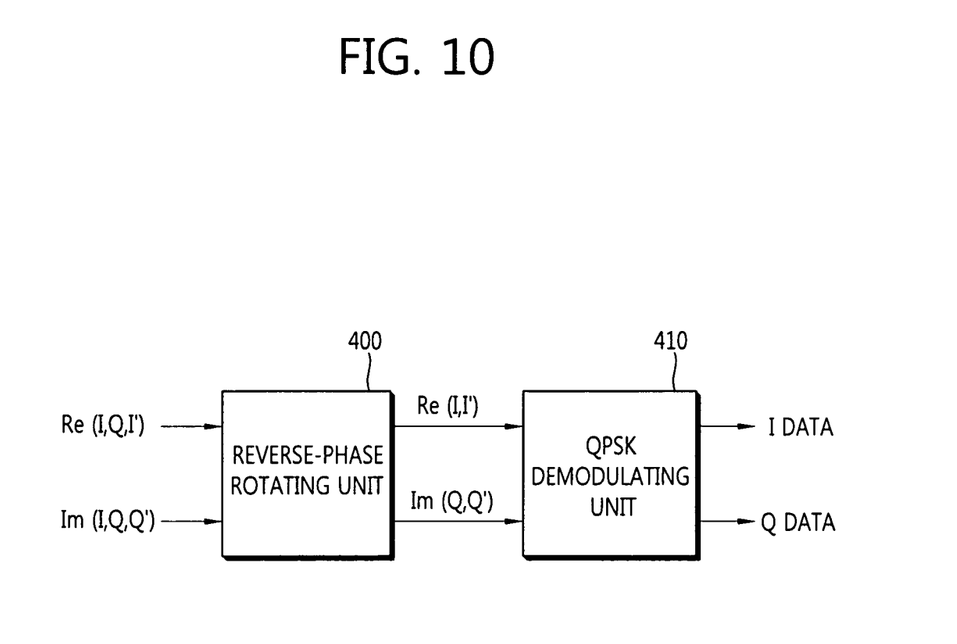
FIG. 10 shows an example of the QPSK demodulator implementing the method of demodulating a signal suggested according to the exemplary embodiment of the present invention.

FIG. 10 shows an example of the QPSK demodulator implementing the method of demodulating a signal suggested according to the exemplary embodiment of the present invention.

The QPSK demodulator has the same structure as that of the QPSK demodulator of FIG. 4. However, the QPSK demodulator in FIG. 10 demodulates a signal demodulated by the layer modulation technology. A reverse-phase rotating unit 400 receives a Re(I, Q, I') signal and an Im(I, Q, Q') signal as inputs and reversely rotates the Re(I, Q, I') signal and the Im(I, Q, Q') signal by θ to output a Re(I, I') signal and an Im(Q, Q') signal. A QPSK demodulating unit 410 receives the Re(I, I') signal and the Im(Q, Q') signal as inputs and regards portions corresponding to I' and Q' signals as noise to recover I and Q data. Since the portions corresponding to the I' and Q' signals are processed as the noise, when only signs of values corresponding to each constellation on the Re or Im axis are determined, the I and Q data may be recovered. That is, when Re(I, I')>0 and Im(Q, Q')>0, it may be determined that a value of the constellation is '00', when Re(I, I')>0 Im(Q, Q')<0, it may be determined that a value of the constellation is '01, when Re(I, I')<0 and Im(Q, Q')>0, it may be determined that a value of the constellation is '10', when Re(I, I')<0 and Im(Q, Q')<0, it may be determined that a value of the constellation '11'.

Figure 11:
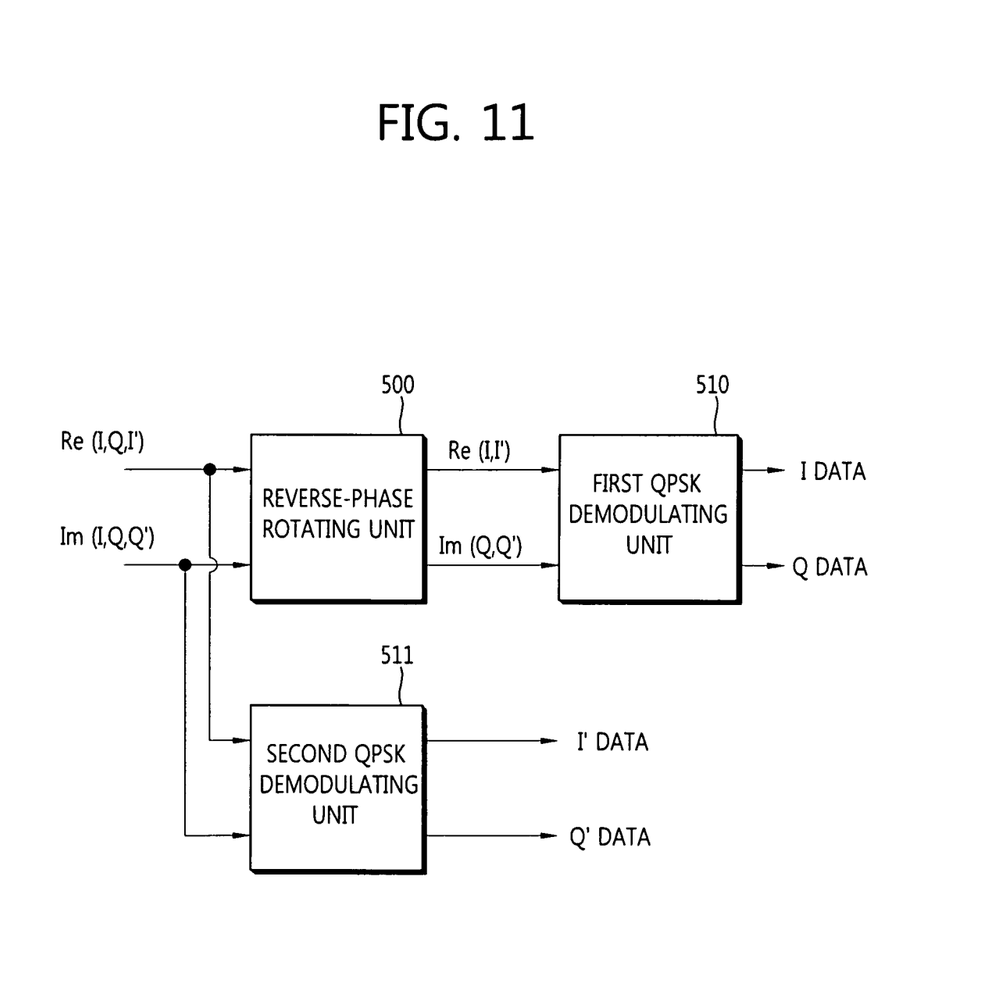
FIG. 11 shows another example of the QPSK demodulator implementing the method of demodulating a signal suggested according to the exemplary embodiment of the present invention.

FIG. 11 shows another example of the QPSK demodulator implementing the method of demodulating a signal suggested according to the exemplary embodiment of the present invention.

Referring to FIG. 11, the QPSK demodulator includes a reverse-phase rotating unit 500, a first QPSK demodulating unit 510, and a second QPSK demodulating unit 511. The first QPSK demodulating unit 510 is the same as the QPSK demodulating unit of FIG. 10 in that it receives a Re(I, Q, I') signal and an Im(I, Q, Q') signal as inputs to recover I and Q data. In addition, the second QPSK demodulating unit 511 receives the Re(I, Q, I') signal and the Im(I, Q, Q') signal as inputs to recover I' and Q' data. At this time, the I' and Q' data may be recovered by various determination references. For example, in the Re(I, Q, I') signal, when Re(I, Q, I')≥(b+c)/2 and Re(I, Q, I')≤c+d/2, the I' data is recovered to +1, when Re(I, Q, I')≥(b+c)/2 and Re(I, Q, I')>c+d/2, the I' data is recovered to −1, when Re(I, Q, I')≤−(b+c)/2 and Re(I, Q, I')≥−c−d/2, the I' data is recovered to +1, and when Re(I, Q, I')≤−(b+c)/2 and Re(I, Q, I')<−c−d/2, the I' data is recovered to −1. Alternately, in the Im(I, Q, Q') signal, when Im(I, Q, Q')≥(b+c)/2 and Im(I, Q, Q')≤c+d/2, the Q' data is recovered to +1, when Im(I, Q, Q')≥(b+c)/2 and Im(I, Q, Q')>c+d/2, the Q' data is recovered to −1, when Im(I, Q, Q')≤−(b+c)/2 and Im(I, Q, Q')≥−c−d/2, the Q' data is recovered to +1, and when Im(I, Q, Q')≤−(b+c)/2 and Im(I, Q, Q')<−c−d/2, the Q' data is recovered to −1.

Figure 12:
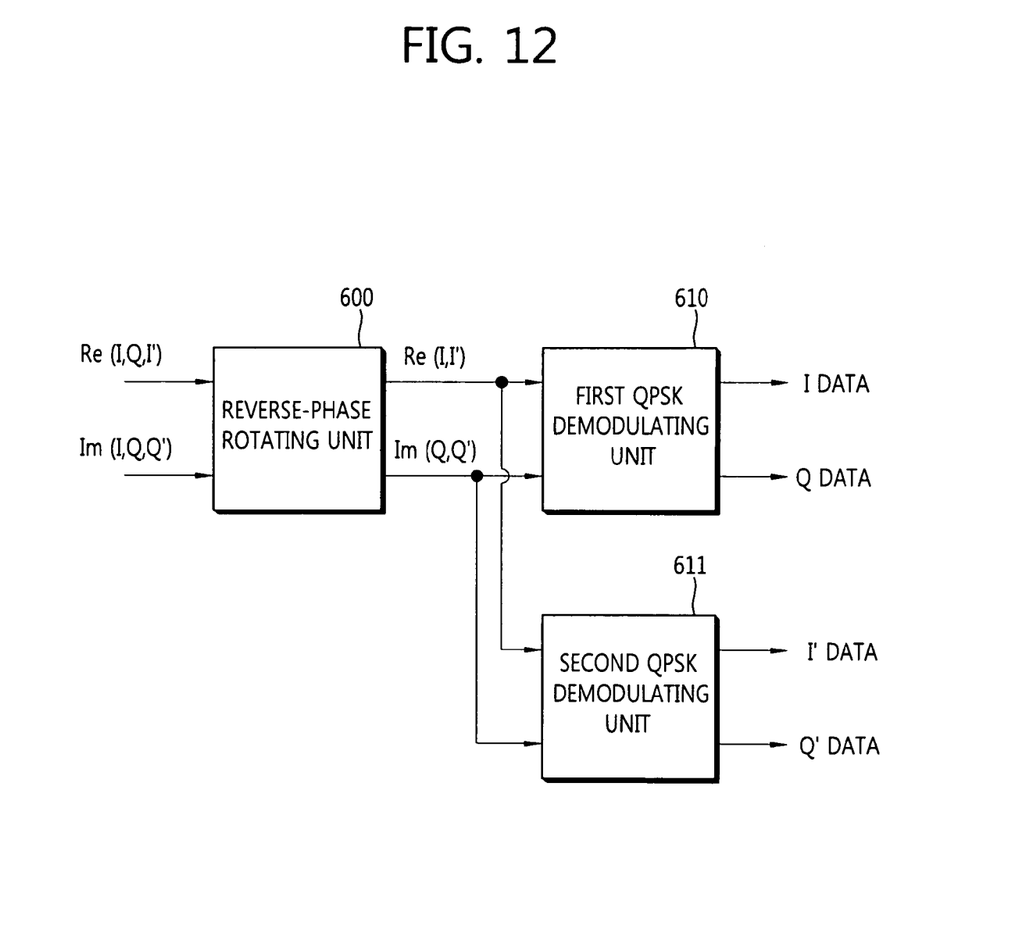
FIG. 12 shows still another example of the QPSK demodulator implementing the method of demodulating a signal suggested according to the exemplary embodiment of the present invention.

FIG. 12 shows still another example of the QPSK demodulator implementing the method of demodulating a signal suggested according to the exemplary embodiment of the present invention.

Referring to FIG. 12, the QPSK demodulator includes a reverse-phase rotating unit 600, a first QPSK demodulating unit 610, and a second QPSK demodulating unit 611. The first QPSK demodulating unit 510 is the same as the QPSK demodulating unit of FIG. 10 in that it receives a Re(I, Q, I') signal and an Im(I, Q, Q') signal as inputs to recover I and Q data. In addition, the second QPSK demodulating unit 611 receives a Re(I, I') signal and an Im(Q, Q') signal, which are outputs of the reverse-phase rotating unit 600, as inputs to recover I' and Q' data. At this time, the I' and Q' data may be recovered by various determination references. For example, in the Re(I, I') signal, when Re(I, I')≥0 and Re(I, I')≤a+e/2, the I' data is recovered to +1, when Re(I, I')≥0 and Re(I, I')>a+e/2, the I' data is recovered to −1, when Re(I, I')<0 and Re(I, I')≥−a−e/2, the I' data is recovered to +1, and when Re(I, I')<0 and Re(I, I')<−a−e/2, the I' data is recovered to −1. Alternatively, in the Im(Q, Q') signal, when Im(Q, Q')≥0 and Im(Q, Q')≤a+e/2, the Q' data is recovered to +1, when Im(Q, Q')≥0 and Im(Q, Q')>a+e/2, the Q' data is recovered to −1, when Im(Q, Q')<0 and Im(Q, Q')≥−a−e/2, the Q' data is recovered to +1, and when Im(Q, Q')<0 and Im(Q, Q')<−a−e/2, the Q' data is recovered to −1.

Figure 13:
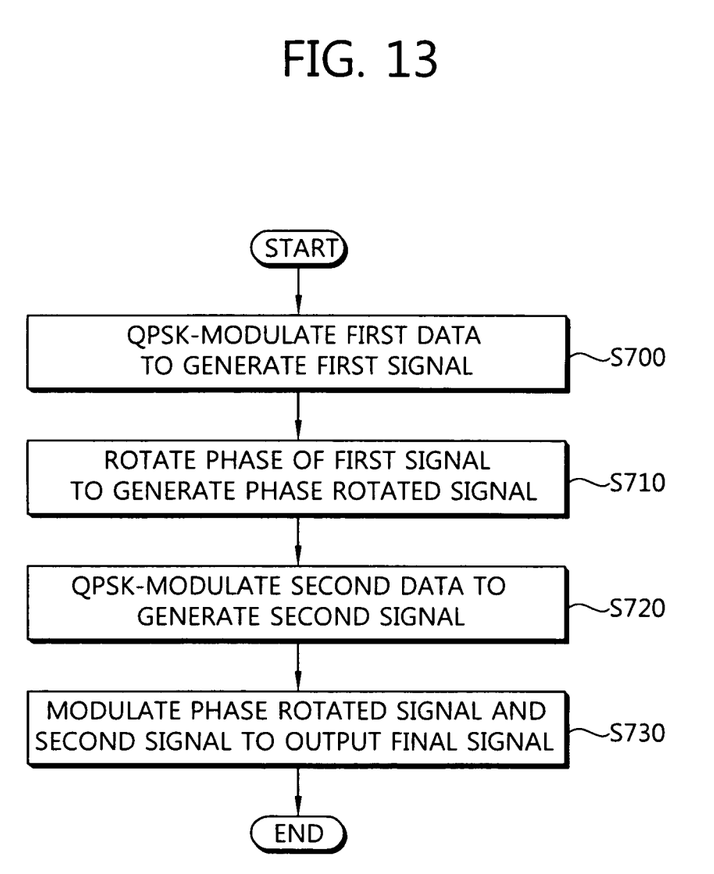
FIG. 13 shows an example of the method of modulating a signal suggested according to the exemplary embodiment of the present invention.

FIG. 13 shows an example of the method of modulating a signal suggested according to the exemplary embodiment of the present invention.

Referring to FIG. 13, in operation (S700), a modulator QPSK-modulates first data to generate a first signal. The first data includes I and Q data, and the first signal includes I and Q signals. In operation (S710), the modulator rotates a phase of the first signal to generate a phase rotated signal. In operation (S720), the modulator QPSK-modulates second data to generate a second signal. The second data includes I' and Q' data, and the second signal includes I' and Q' signals. In operation (S730), the modulator modulates the phase rotated signal and the second signal to output a final signal.

Figure 14:
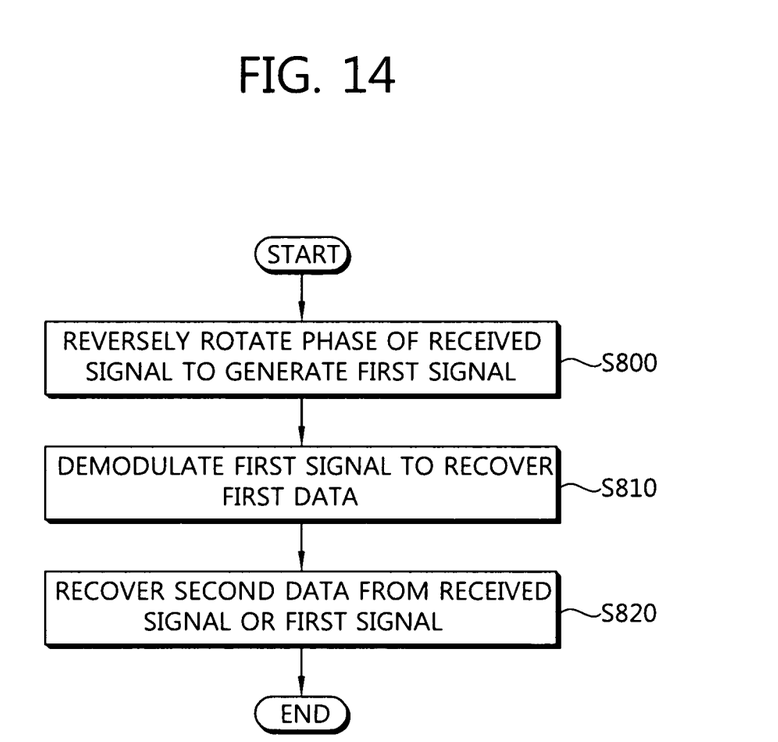
FIG. 14 shows an example of the method of demodulating a signal suggested according to the exemplary embodiment of the present invention.

FIG. 14 shows an example of the method of demodulating a signal suggested according to the exemplary embodiment of the present invention.

Referring to FIG. 14, in operation (S800), a demodulator reversely rotate a phase of a received signal to generate a first signal. In step (S810), the demodulator demodulates the first signal to recover first data. The first data includes I and Q data. In operation (S820), the demodulator demodulates the received signal or the first signal to recover second data. The second data includes I' and Q' data.

The layer modulation technology is applied to the QPSK modulation technology to which the rotated constellation according to the related art is applied, thereby making it possible to transmit additional data while securing backward compatibility and to recover independently transmitted additional data at a receiving end.

The present invention may be implemented by hardware, software, or a combination thereof. The hardware may be implemented as an application specific integrated circuit (ASIC), digital signal processing (DSP), a programmable logic device (PLD), a field programmable gate array (FPGA), a processor, a controller, a microprocessor, other electronic units, or a combination thereof, all of which is designed in order to perform the above-mentioned functions. The software may be implemented as a module performing the above-mentioned functions. The software may be stored in a memory unit and is executed by a processor. The memory unit or the processor may adopt various units that are known to those skilled in the art.

In the above-mentioned exemplary system, although the methods have described based on a flow chart as a series of steps or blocks, the present invention is not limited to a sequence of steps but any step may be generated in a different sequence or simultaneously from or with other steps as described above. Further, it may be appreciated by those skilled in the art that steps shown in a flow chart is non-exclusive and therefore, include other steps or deletes one or more steps of a flow chart without having an effect on the scope of the present invention.

The above-mentioned embodiments include examples of various aspects. Although all possible combinations showing various aspects are not described, it may be appreciated by those skilled in the art that other combinations may be made. Therefore, the present invention should be construed as including all other substitutions, alterations and modifications belong to the following claims.

What is claimed is:

1. A modulator in a broadcasting and communication system, the modulator comprising:
    a first quadrature phase shift keying (QPSK) modulating unit QPSK-modulating first data including in-phase (I) data and quadrature (Q) data to generate a first signal;
    a phase rotating unit rotating a phase of the first signal by a predetermined angle θ to generate a phase rotated signal;
    a second QPSK modulating unit QPSK-modulating second data different from the first data and including I' data and Q' data to generate a second signal; and
    a layer modulating unit modulating the phase rotated signal and the second signal to output a final signal,
    wherein the layer modulating unit includes:
        a detecting unit detecting a value of the phase rotated signal on a real (Re) axis or an imaginary (Im) axis;
        a binary phase shift keying (BPSK) mapping unit mapping the second signal onto a constellation; and
        a multiplexer (MUX) multiplexing the phase rotated signal and the second signal mapped onto the constellation in a single signal stream form to output the final signal.

2. The modulator of claim 1, wherein the phase rotated signal includes a Re(I, Q) signal or an Im(I, Q) signal, where I and Q indicate components of the first signal generated by modulating the first data.

3. The modulator of claim 2, wherein the Re(I, Q) signal or the Im(I, Q) signal has any one of predetermined value +b, −b, +c, and −c.

4. The modulator of claim 1, wherein the final signal includes a Re(I, Q, I') signal or an Im(I, Q, Q') signal, where I and Q indicate components of the first signal generated by modulating the first data respectively and I' and Q' indicate components of the second signal generated by modulating the second data respectively.

5. The modulator of claim 4, wherein whether or not the second signal is applied to the final signal according to a value of the I' or the Q' is determined when a specific value of the phase rotated signal is detected on the Re or Im axis.

6. The modulator of claim 4, wherein the predetermined value d is applied to a value of the Re(I, Q, I') signal when a value of a Re(I, Q) signal is the predetermined value +c or −c and a value of the I' is −1.

7. The modulator of claim 4, wherein the predetermined value d is applied to a value of the Im(I, Q, Q') signal when a value of an Im(I, Q) signal is the predetermined value +c or −c and a value of the Q' is −1.

8. A method of modulating a signal in a broadcasting and communication system, the method comprising:
    modulating first data including in-phase (I) data and quadrature (Q) data by a quadrature phase shift keying (QPSK) scheme to generate a first signal;
    rotating a phase of the first signal by a predetermined angle θ to generate a phase rotated signal;
    modulating second data different from the first data and including I' data and Q' data by a QPSK scheme to generate a second signal; and
    modulating the phase rotated signal and the second signal to output a final signal,
    wherein the modulating the phase rotated signal and the second signal includes detecting a value of the phase rotated signal on a real (Re) axis or an imaginary (Im) axis;
    mapping the second signal onto a constellation; and
    multiplexing the phase rotated signal and the second signal mapped onto the constellation in a single signal stream form to output the final signal.

9. A demodulator in a broadcasting and communication system, the demodulator comprising:
    a reverse-phase rotating unit reversely rotating a phase of a received signal by a predetermined angle θ to generate a first signal;
    a first quadrature phase shift keying (QPSK) demodulating unit demodulating the first signal to recover a first data including in-phase (I) and quadrature (Q) data; and
    a second QPSK demodulating unit recovering second data different from the first data and including I' and Q' data from the received signal or the first signal.

10. The demodulator of claim 9, wherein the first data is recovered by determining a sign of a value of the first signal on a real (Re) or imaginary (Im) axis.

11. The demodulator of claim 9, wherein the second data is determined and recovered according to a range of a value of the received signal or the first signal.

* * * * *